United States Patent
Meersman et al.

(10) Patent No.: US 12,073,749 B2
(45) Date of Patent: Aug. 27, 2024

(54) METHOD AND SYSTEM FOR ACOUSTICALLY TRANSPARENT LIGHT EMITTING DISPLAY

(71) Applicant: BARCO N.V., Kortrijk (BE)

(72) Inventors: Karim Meersman, Kortemark (BE); Greet Adams, Deerljk (BE); Daniel De Caster, Kruishoutem (BE)

(73) Assignee: BARCO N.V., Kortrijk (BE)

(*) Notice: Subject to any disclaimer, the term of this patent is extended or adjusted under 35 U.S.C. 154(b) by 722 days.

(21) Appl. No.: 17/297,643

(22) PCT Filed: Dec. 21, 2018

(86) PCT No.: PCT/EP2018/086820
§ 371 (c)(1),
(2) Date: May 27, 2021

(87) PCT Pub. No.: WO2020/126061
PCT Pub. Date: Jun. 25, 2020

(65) Prior Publication Data
US 2022/0058995 A1     Feb. 24, 2022

(51) Int. Cl.
*G09F 9/33* (2006.01)
*G06F 1/16* (2006.01)
(Continued)

(52) U.S. Cl.
CPC .......... *G09F 9/335* (2021.05); *G06F 1/1601* (2013.01); *G09F 27/00* (2013.01); *H04R 1/023* (2013.01)

(58) Field of Classification Search
CPC . G09F 9/33; G09F 9/335; G09F 27/00; H04R 1/02; H04R 1/023; H04R 1/025; H04R 1/028; H04R 2499/15; G06F 1/1601
See application file for complete search history.

(56) References Cited

U.S. PATENT DOCUMENTS

| | | | | |
|---|---|---|---|---|
| 7,559,673 B2* | 7/2009 | Meersman | ............. | G09F 13/22 |
| | | | | 362/342 |
| 11,924,596 B2* | 3/2024 | Menzinger | ............. | H04R 1/028 |
| | | (Continued) | | |

FOREIGN PATENT DOCUMENTS

| | | |
|---|---|---|
| CN | 207115904 U | 3/2018 |
| CN | 108230938 A | 6/2018 |
| | (Continued) | |

OTHER PUBLICATIONS

Office Action with respect to the examination of the related Chinese patent application 201880100323.4 dated Dec. 21, 2022, with English translation.
(Continued)

*Primary Examiner* — Edgardo San Martin
(74) *Attorney, Agent, or Firm* — HSML P. C.

(57) ABSTRACT

A system and method for providing an acoustically transparent imaging display include a substrate with light sources on one side and perforations having a first visible optical reflectance, the perforations extending perpendicularly to the display surface and being disposed between the light sources. The side of the substrate opposing the light sources faces a black surface of an enclosure.

A layer having a second visible optical reflectance is disposed on the substrate on the side of the light sources. The layer has an acoustical transparency attenuation of at most −10 dB, and when in normal light conditions the difference between the visible optical reflectance of the layer and that of the perforations is lower than the difference between visible optical reflectance of the substrate and that of the perforation.

20 Claims, 4 Drawing Sheets

(51) Int. Cl.
    *G09F 27/00*     (2006.01)
    *H04R 1/02*     (2006.01)

(56) References Cited

U.S. PATENT DOCUMENTS

| | | |
|---|---|---|
| 2013/0094126 A1 | 4/2013 | Rappoport et al. |
| 2014/0177895 A1 | 6/2014 | Buisker et al. |
| 2014/0177896 A1 | 6/2014 | Buisker et al. |
| 2017/0164081 A1 | 6/2017 | Buisker et al. |

FOREIGN PATENT DOCUMENTS

| | | | |
|---|---|---|---|
| CN | 115410489 A | * | 11/2022 |
| CN | 115497392 A | * | 12/2022 |
| EP | 2037437 A1 | | 3/2009 |
| EP | 2439940 A1 | | 4/2012 |
| JP | 10784533 A | | 3/1995 |
| WO | 2010140811 A1 | | 12/2010 |
| WO | WO-2020063702 A1 | * | 4/2020 |

OTHER PUBLICATIONS iSR and Written Opinion in corresponding PCT Application No. PCT/EP2018/086820 dated Sep. 19, 2019.

* cited by examiner a)

b)

a)

b)

METHOD AND SYSTEM FOR ACOUSTICALLY TRANSPARENT LIGHT EMITTING DISPLAY

The present invention relates to the field of light emitting displays that are also acoustically transparent, whereby loudspeakers can be placed behind the light emitting display and the sound can be transmitted through the display. The present invention relates to the field of acoustically transparent displays implemented by foreseeing openings between the light sources where the sound can be transmitted.

BACKGROUND

The present invention pertains to the field of light emitting displays that are also acoustically transparent. Loudspeakers can be placed behind the light emitting display and the sound can be transmitted through the display. Acoustically transparent displays can be implemented by foreseeing openings between the light sources where the sound can be transmitted. WO2010140811 A1 discloses a sound penetrating display apparatus that has holes disposed between the pixels of the display panel. US20170164081 A1 discloses an audio and display system having a housing with a housing wherein an audio speaker can be placed.

SUMMARY OF THE INVENTION

Embodiments of the present invention can provide light emitting displays that are also acoustically transparent. Loudspeakers can be placed behind the light emitting display and the sound can be transmitted through the display. Embodiments of the present invention provide acoustically transparent displays that can be implemented by foreseeing openings between the light sources where the sound can be transmitted.

Embodiments of the present invention provide a system for providing an acoustically transparent imaging display comprising a substrate with light sources on one side, a display surface and perforations having a first visible optical reflectance, the perforations extends perpendicularly to the display surface and are disposed between the light sources, the substrate side opposing the light sources facing a black surface of an enclosure, wherein a layer having a second visible optical reflectance is disposed on the substrate on the side of the light sources, the layer having an acoustical transparency attenuation of at most −10 dB, and the difference between the optical reflectance in the visible wavelength range of the layer and that of the perforations is lower than the difference between optical reflectance in the visible wavelength range of the substrate and that of the perforations.

This can provide an acoustically transparent imaging display with good sound performance.

The layer can have an optical transparency in the human visible wavelength range of at least 30%.

The layer can comprise openings at the positions of the light sources.

The layer can comprise an adhesive and/or fibres. The fibres can have a length of 0.2-10 mm and/or a thickness of 0.01 to 1 mm.

The diameter of a perforation can be 0.2-20 mm.

A pitch of the perforations can be made to depend on the diameter of the perforations and is 0.4-100 mm.

The light sources can be solid state light sources, LEDs or OLEDs or COB.

The light sources can have a largest side of 0.005-3 mm.

The light sources can be placed on the substrate with a pitch that depends on the largest side of the light sources and is between 0.4-20 mm.

An intermediate sheet can be placed between the substrate and the layer.

The intermediate sheet can have a Young's modulus of 0.5 GPa or more. The intermediate sheet can comprise an adhesive.

Embodiments of the present invention can provide a method for configuring a system for an acoustically transparent imaging display comprising a display surface of a substrate with light sources on one side and perforations having a first visible optical reflectance, the perforations extending perpendicularly to the display surface and are disposed between the light sources, the method comprising: Providing a black surface of an enclosure and the substrate side opposing the light sources faces the black surface of the enclosure, disposing a layer having a second visible optical reflectance on the substrate on the side of the light sources, wherein the layer has an acoustical transparency attenuation of at most −10 dB, and the difference between the optical reflectance in the visible wavelength range of the layer and that of the perforations is lower than the difference between optical reflectance in the visible wavelength range of the substrate and that of the perforations.

The layer can have an optical transparency in the human visible wavelength range of at least 30%.

The layer can be provided with openings at the positions of the light sources.

The layer can comprise an adhesive or wherein the layer comprises fibres.

The fibres can have a length of 0.2-10 mm.

The fibres can have a thickness of 0.01 to 1 mm.

The diameter of a perforation can be 0.2-20 mm.

A pitch of the perforations can be made to depend on the diameter of the perforations and is 0.4-100 mm.

The light sources can be solid state light sources such as LEDs or OLEDs or COB.

The light sources can have a largest side of 0.005-3 mm.

The light sources can be placed on the substrate with a pitch that depends on the largest side of the light sources and is between 0.4-20 mm.

An intermediate sheet can be placed between the substrate and the layer.

The intermediate sheet can have a Young's modulus of 0.5 GPa or more. The intermediate sheet can comprise an adhesive.

DEFINITIONS

The "black level" of a display system can be defined as the amount of ambient visible light that the system can absorb.

A "flock" material can comprise many fiber particles held together by an adhesive.

An "acoustically transparent" material can transmit acoustic waves, for example in the range of 100 Hz to 30 kHz. The transparency of the material can be expressed in "acoustic attenuation (dB)".

An "optically transparent" material can transmit electromagnetic radiation. The wavelength range can for example be the "human visible range" of wavelengths between ca 390 nm to 700 nm.

"Optical reflectance" in the visible wavelength range can be measured for example with a UltraScan Pro spectrophotometer by Hunterlab, according to instrument specifications and related standards.

DETAILED DESCRIPTION OF THE INVENTION

It is an objective of the present invention to overcome deficiencies of the above mentioned prior art. In one embodiment of the present invention there can be small perforations or holes distributed in a pattern between the light sources. The light source can be e.g. a solid state light source such as a LED (Light Emitting Diode), OLED (Organic Light Emitting Diode), or COB (chip on board). However this pattern is in many cases not regularly distributed. A light emitting display board has, typically on the back side, driver and/or power electronic components and/or mechanical parts that by their presence can prevent the placement of a perforation for audio transmission, resulting in unevenly distributed areas without perforations.

Figure 1:
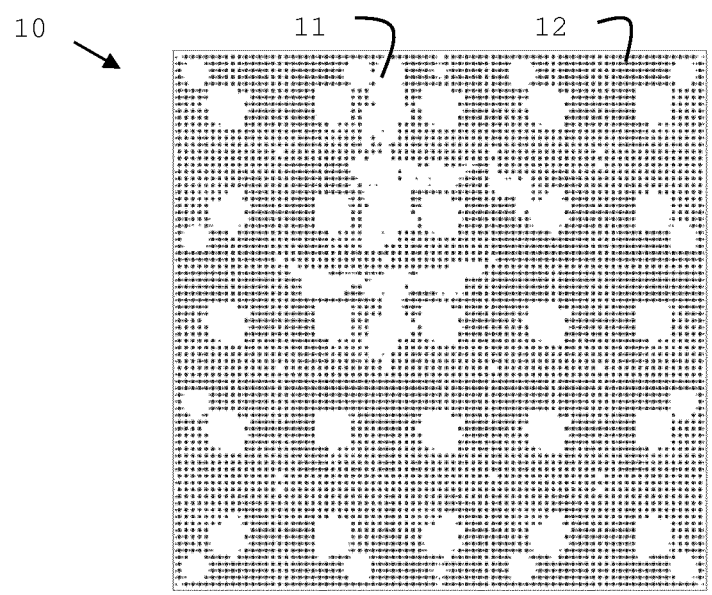
FIG. 1 shows an embodiment of the present invention comprising an uneven distribution of perforations.

FIG. 1 shows a printed circuit board (PCB) 10 having perforations 12 (black dots) and regions with no perforations 11 (white areas), both being being unevenly distributed. This unevenly distributed perforation pattern can result in a visual disturbance of the front view of the light emitting display, such as visual artefacts, uneven black level and in case of a tiled display there can be visual accentuation of the tiled pattern.

Additionally, the perforations can comprise e.g. electronic materials such as Copper, which may give a color or hue at the position of the perforation.

An aim of the present invention is to mask/hide the visual effect of uneven or even perforation patterns. This can be obtained if the optical response, e.g. the visual reflectance, of the substrate (e.g. PCB) and that of the perforations are made as equal as possible. The skilled person understands that the evaluated signal can also be absorptance or emittance. An additional layer or mask with appropriate optical properties can be deposited on top of the substrate.

In one embodiment of the present invention there can be a masking layer with integrated acoustically transparent material placed in front of the perforation pattern. It is known that a mask can be used to enhance the visual performance and black level in a light emitting display. Such mask (or shader) is typically a black hard plastic injection part that has an array of openings that can be aligned with the position of the light sources and is attached to the display board. One embodiment of the present invention comprises a masking layer of an acoustically transparent material which can mask the perforation pattern visually without hindering the sound going through the perforations.

Figure 2:
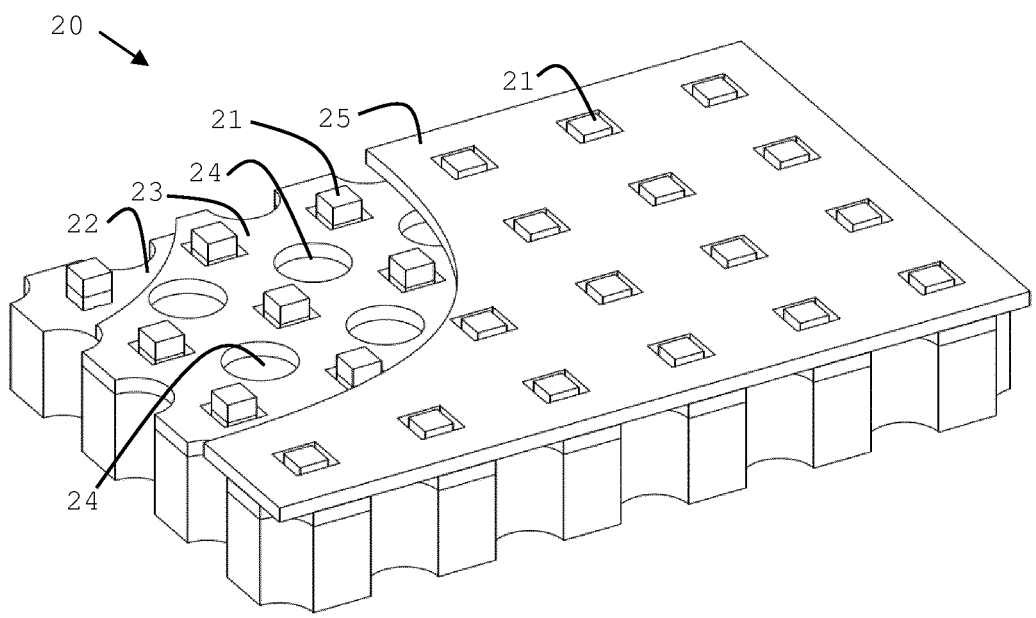
FIGS. 2a) and b) show an embodiment of the present invention comprising a part of an imaging display with a masking layer.
Figure 2:
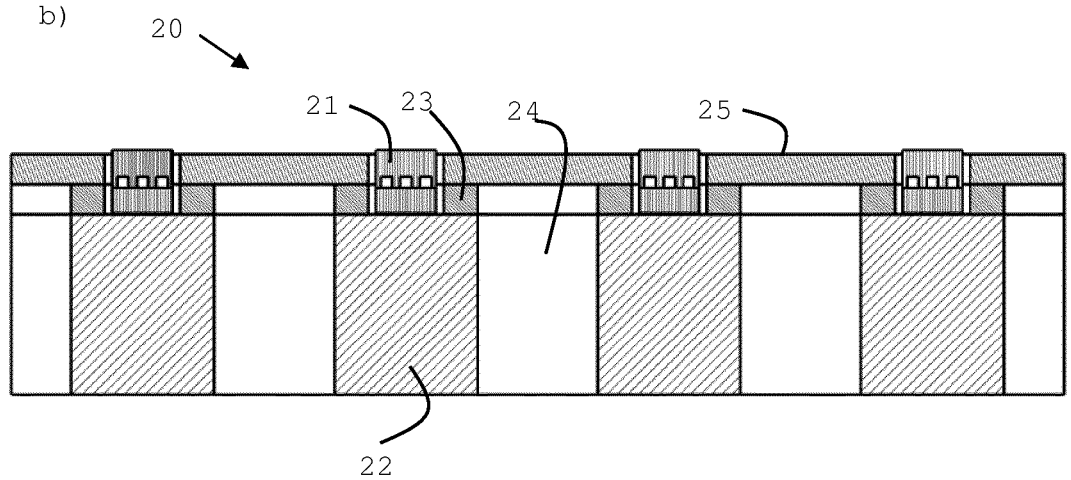

FIG. 2 shows embodiments of the present invention; FIG. 2a) shows a top view and FIG. 2b) a cross-section of a side view. FIG. 2a) comprises a perforated PCB 20 having a substrate 22, a light sources 21, perforations 24, an intermediate sheet 23, e.g. precision machined plastic, with openings that are aligned with the light sources 21 and the PCB perforations 24. The exposed surface between the light sources 21 can be covered with a masking layer 25 which can be acoustically transparent and therefore placed over the perforations 24.

FIG. 2b) shows the perforated PCB board 20 comprising the substrate 22, a perforation 24, a intermediate sheet 23, a light source 21 and a masking layer 25 that covers the perforation 24.

The intermediate sheet 23 can provide an interface layer to e.g. counteract stretching due to elasticity in the mask 25. Additionally or alternatively it can comprise means for adhesion. Optionally, the intermediate sheet 23 can be only locally applied or not present at all. For example, if the masking layer 25 is already sufficiently non-elastic, the non-elasticity properties of the intermediate sheet 23 may not be required. It is previously known that the masking layer 25 can be mounted onto the substrate with the light sources by using e.g. guiding pins. In such case it is beneficial if the masking layer 25 does not stretch during the assembling process. The intermediate layer can have a Young's modulus of 0.5 GPa or more. The intermediate sheet 23 can be patterned by using e.g. laser cutting, punching or water jetting, and it can further be attached to the PCB 22 with e.g. adhesives, a mechanical "clicking system", magnets etc. Additionally or alternatively, openings in the intermediate sheet 23 can be foreseen directly in the manufacturing process.

The masking layer 25 can be attached to the intermediate sheet 23 by e.g. comprising a self-adhesive layer, glue or welding. Alternatively, the mask 25 could be directly attached to the PCB 22.

In another embodiment of the present invention (not shown) the masking layer 25 can be also visually optical transparent and also partly or fully covering the light sources. The transparency in the optical visible range of such masking layer can be at least 30% or at least 50%.

Figure 3:
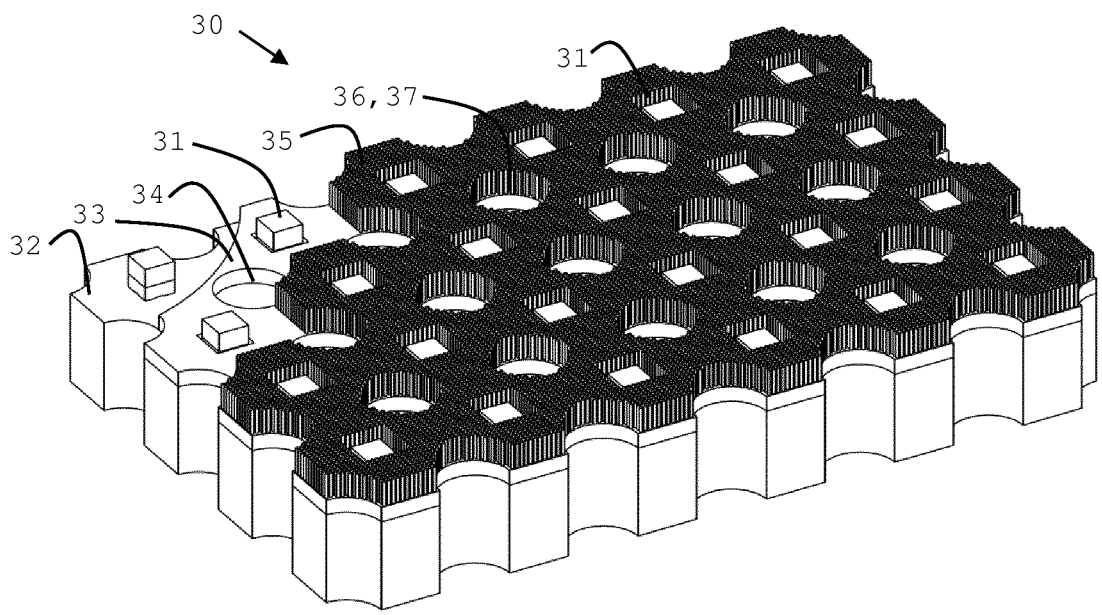
FIGS. 3a) and b) show an embodiment of the present invention where the masking layer comprises a finishing material.
Figure 3:
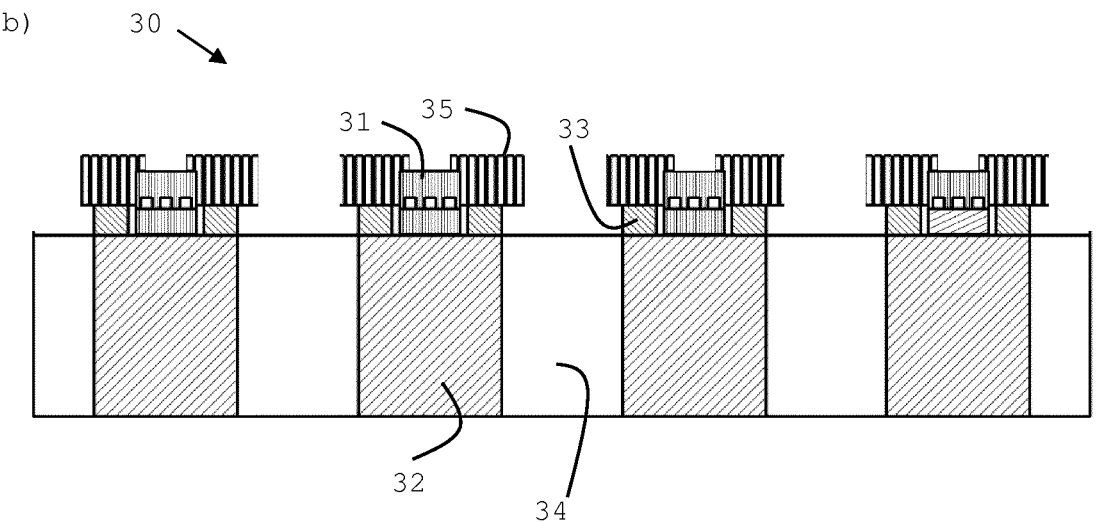

In another embodiment of the present invention the masking layer 25 can have openings at the position of the holes and optionally comprise a flock finishing as illustrated in FIGS. 3a) and b). FIG. 3a) shows a perforated PCB 30 comprising a substrate 32, light sources 31, an intermediate sheet 33 having perforations 34 and 36, and a masking layer 35 which also has perforations, for example 37. The intermediate sheet 33 can be the same as intermediate sheet 23. FIG. 3b) shows the same perforated PCB 30 in a cross-sectional side-view, comprising the PCB 22, a light source 31, an intermediate layer 33, a perforation 24 and the flock masking layer 35.

Figure 4:
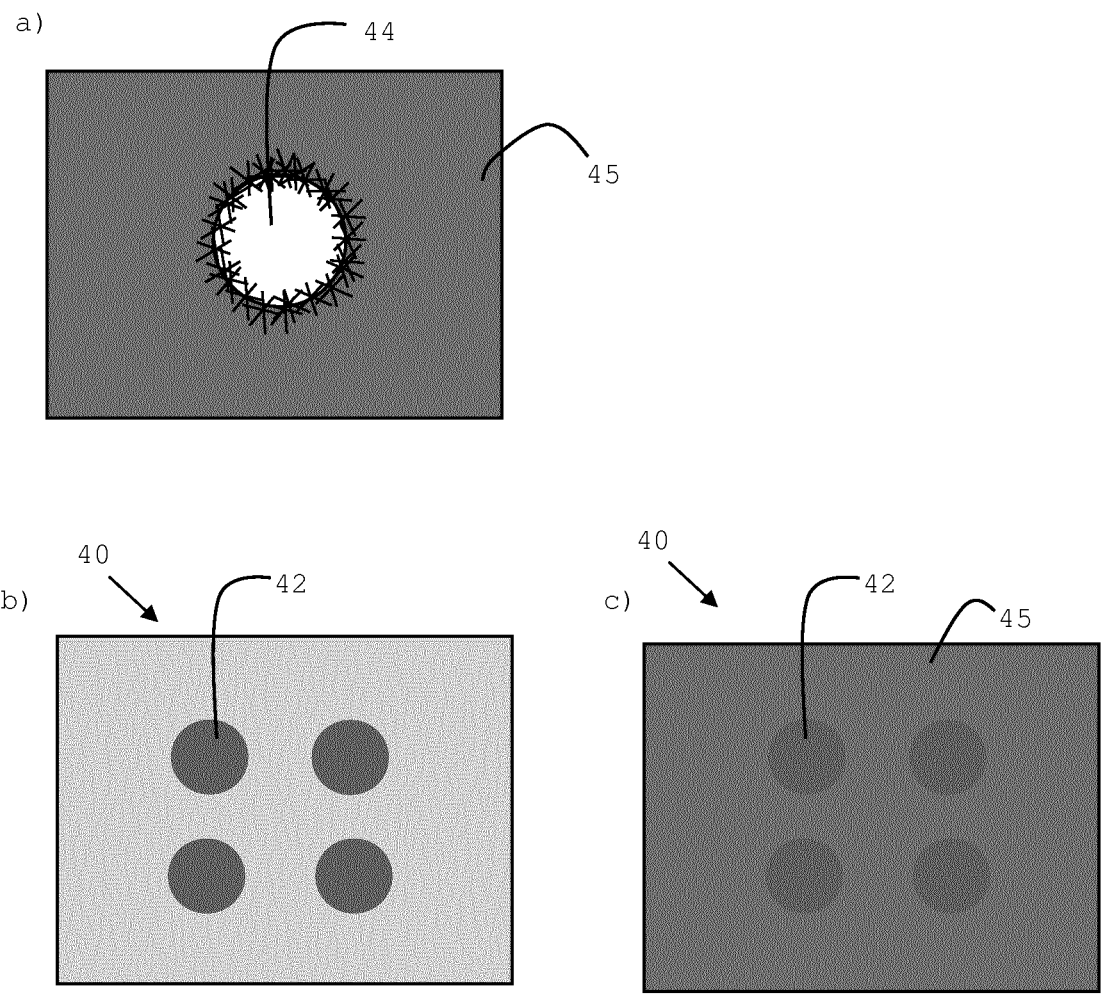
FIGS. 4a) to c) show an embodiment of the present invention comprising a masking layer.

FIG. 4 show embodiments comprising a flock masking layer. FIG. 4a) shows an example of a flock material around an opening 44. The flock comprises fibers that can protrude into the perforations or partly cover the light sources. Light can be absorbed by the 3D structure of the flock, resulting in a surface with a darker black level than if the flock was not present.

The perforations in the display board can themselves have a high black level since they can act like an optical black body. The combination of perforations with a high black level and a masking layer with a high black level can result in a surface having approximately the same black level throughout the surface, hence the perforation pattern can be visually hidden. Since there can be openings for the perforations, the flock material does not necessarily have to be acoustically transparent.

Additionally, flock can be applied in such a way that it partly can cover the perforation, without restricting the sound transparency of the perforations, see FIG. 4. Discrete flock wires can cover the hole from the outside diameter resulting in an optical illusion that the hole is smaller. Since smaller perforations are less visible, a better masking of the perforation pattern can be obtained.

The flock can be seen as one possible finish of the layer. Other finishing are available, for example black matt paint, nano deposition processed materials, micro etching, 3D shapes by injection moulding etc.

Also materials that are or are not acoustically transparent can be used for a masking layer with openings for the perforations. The requirement is that the masking layer should have optical properties so that it decreases the difference between the optical response from the perforations and that of the PCB substrate. FIG. 4b) shows a perforated PCB 40 before adding a masking layer. The holes, e.g. 42, are visible since they appear darker than the surrounding substrate. FIG. 4c) comprises the perforated PCB 40 and a flock masking layer 45. The difference in optical visual reflectance is decreased compared to FIG. 4b).

Exemplary Embodiments

The light sources can be LEDs or OLEDs, each component having a footprint where the largest side can be between 0.005 mm to 3 mm.

For any embodiment the diameter of the perforations can be 0.2-20 mm, and the pitch of the perforations can be 0.4-100 mm, depending on the diameter of the perforations and on the diameter and pitch of the light sources. In one embodiment the perforation diameter was 1 mm and had a pitch of 1.75 mm.

For a acoustically transparent masking layer a Fahnentuch CS Art.-Nr. 1441 can be used. The acoustical attenuation of this exemplary embodiment was measured to be −2 dB or less. However, in a broader context an acoustical attenuation of up to −10 dB can be acceptable.

For a masking layer having openings for the perforations, a flock finishing can be used. The flock particles of fibres can be defined by 0.9 dtex (g/10 km) with typical length between 0.2-10 mm and the thickness of the fibres can be 0.01 to 1 mm. In one exemplary embodiment the fibres were 0.3 mm long and 0.02 mm thick.

The invention claimed is:

1. A system for providing an acoustically transparent imaging display, said system comprising
a substrate with light sources on one side,
a display surface and perforations having a first visible optical reflectance, the perforations extend perpendicularly to the display surface and are disposed between the light sources,
wherein a layer having a second visible optical reflectance is disposed on the substrate on the side of the light sources, the layer having an acoustical transparency attenuation of at most −10 dB, and the difference between the optical reflectance in the visible wavelength range of the layer and that of the perforations is lower than the difference between optical reflectance in the visible wavelength range of the substrate and that of the perforations.

2. The system according to claim 1, wherein the substrate side opposing the light sources faces a surface of an enclosure.

3. The system according to claim 2, wherein the surface is a black surface.

4. The system according to claim 1, wherein the layer has an optical transparency in the human visible wavelength range of at least 30%.

5. The system according to claim 1, wherein the layer comprises openings at the positions of the light sources.

6. The system according to claim 1, wherein the layer comprises an adhesive.

7. The system according to claim 1, wherein the layer comprises fibres.

8. The system according to claim 7, wherein the fibres have a length of 0.2-10 mm.

9. The system according to claim 7, wherein the fibres have a thickness of 0.01 to 1 mm.

10. The system according to claim 1, wherein the diameter of a perforation is 0.2-20 mm.

11. The system according to claim 1, wherein a pitch of the perforations depends on the diameter of the perforations and is 0.4-100 mm.

12. The system according to claim 1, wherein the light sources are solid state light sources, LEDs or OLEDs or COB.

13. The system according to claim 12, wherein the light sources have a largest side of 0.005-3 mm.

14. The system according to claim 1, wherein the light sources being placed on the substrate with a pitch that depends on the largest side of the light sources and is between 0.4-20 mm.

15. The system according to claim 1, further comprising an intermediate sheet between the substrate and the layer.

16. The system according to claim 15, wherein the intermediate sheet has a Young's modulus of 0.5 GPa or more.

17. The system according to claim 15, wherein the intermediate sheet comprises an adhesive.

18. A method for configuring a system for an acoustically transparent imaging display, said system comprising a display surface of a substrate with light sources on one side and perforations having a first visible optical reflectance, the perforations extending perpendicularly to the display surface and are disposed between the light sources, the method comprising:
disposing a layer having a second visible optical reflectance on the substrate on the side of the light sources, wherein the layer has an acoustical transparency attenuation of at most −10 dB, and the difference between the optical reflectance in the visible wavelength range of the layer and that of the perforations is lower than the difference between optical reflectance in the visible wavelength range of the substrate and that of the perforations.

19. The method according to claim 18, further comprising providing an enclosure, wherein the substrate side opposing the light sources faces a surface of the enclosure.

20. The method according to claim 19, wherein the surface is a black surface.

* * * * *